United States Patent [19]

Ziegler

[11] 4,401,015
[45] Aug. 30, 1983

[54] APPARATUS FOR THE BAKING OF IRREGULARLY TRIMMED WAFFLE, MAINLY CHEESE WAFFLE

[75] Inventor: János Ziegler, Budapest, Hungary

[73] Assignee: Licencia Talalmanyokat Ertekesito Vallalat, Budapest, Hungary

[21] Appl. No.: 248,368

[22] Filed: Mar. 27, 1981

[51] Int. Cl.³ .......................................... A47J 37/00
[52] U.S. Cl. ...................................... 99/373; 99/374; 222/219
[58] Field of Search ................. 99/372, 373, 374, 377, 99/380, 443 C; 222/217, 218, 219

[56] References Cited

U.S. PATENT DOCUMENTS

| | | | |
|---|---|---|---|
| 967,147 | 8/1910 | Trewick | 99/373 |
| 1,117,929 | 11/1914 | Turnbull | 99/373 |
| 1,507,883 | 9/1924 | Campbell | 99/373 |
| 1,872,103 | 8/1932 | Bergmann | 222/219 X |

FOREIGN PATENT DOCUMENTS

| | | | |
|---|---|---|---|
| 515739 | 12/1952 | Belgium | 99/373 |
| 1966079 | 8/1971 | Fed. Rep. of Germany | 99/373 |
| 2048505 | 8/1973 | Fed. Rep. of Germany | 99/374 |
| 1228223 | 8/1960 | France | 99/373 |
| 715345 | 9/1954 | United Kingdom | 99/373 |

*Primary Examiner*—Billy J. Wilhite
*Attorney, Agent, or Firm*—Young & Thompson

[57] ABSTRACT

The invention relates to an apparatus for the production of irregularly trimmed waffle, mainly cheese waffle from batter which has preferably been made as follows: eggs are mixed with milk, melted cheese and flavoring additives to a homogeneous mixture. Then flour and melted fats are added to the mixture with continuous mixing and finally liquid is added until it is diluted to the required consistency. Portions are taken from the resulting batter to be baked between baking plates which form only the sides of the waffle and leave the edges free. The apparatus has baking irons consisting of heatable and closable pairs of baking plates. The baking plates (2a, 2b) of the baking irons (2) have a functional surface forming the sides of the waffle but leaving its edges free. A device (50, 51) for forwarding the baking irons (2) on an endless path, to which device the lower baking plates (2b) of the baking irons (2) are fixed. The upper baking plates (2a) are in coaction with the opening and closing cams (3, 5) in certain sections of the path of motion. In the path of motion between the opening and closing cams (3, 5) waffle removing unit (7) coacts with the lower baking plates (2b), and a feeding device (6) is arranged after the removing unit (7) in the downstream direction of the path of progress (C) of the baking irons (2) which feeding unit supplies the lower baking plates (2b) of the open baking irons with portions of raw material.

4 Claims, 6 Drawing Figures

APPARATUS FOR THE BAKING OF IRREGULARLY TRIMMED WAFFLE, MAINLY CHEESE WAFFLE

BACKGROUND OF THE INVENTION

The invention relates to an apparatus for the production of irregularly trimmed waffle, mainly cheese waffle.

As is known, regularly trimmed waffles are generally produced from a liquid batter of flour fats, and water or milk. After suitable mixing, the batter—portioned mostly by hand—is placed on a heated metal plate. The batter portion is pressed by another heated metal plate from above and in this way is pressed into the shape (pattern) of the cavity formed by the two metal plates. The batter remains pressed between the two metal plates (baking irons) until the waffle is baked. When the baking irons are opened the waffles are removed by hand.

Generally, commercial waffle irons are arranged on stand in several rows. The waffle maker passes between the lines of waffle irons, opens the upper part of each waffle-iron by hand, removes each baked and trimmed waffle by hand, or hand tool, spoons in the next batter portion, and closes the upper and lower part of each baking iron. From this it follows that a single waffle-maker can operate only as many baking-irons as he can fill with batter by the time the waffle in the first waffle iron he has filled is baked.

A drawback of the above known solutions is, that their productivity is low and they require a great deal of hand work. A further drawback is that removal of the waffle from the baking iron while ensuring a regular edge is fairly difficult, as the waffle often gets stuck in the iron.

SUMMARY OF THE INVENTION

It is, accordingly, an object of the present invention to overcome these disadvantages.

More particularly, it is an object of the invention to provide an apparatus whereby productivity of the waffle baking can be considerably increased comparison with that of the known solutions, the manual work reduced to a minimum, and removal of the baked waffles is made safer.

These problems are solved according to the invention with an apparatus for the production of irregularly trimmed waffle, mainly cheese waffle, in which the eggs, milk, melted cheese, and seasonings are mixed to a homogeneous mixture, flour and fats are added with continuous mixing, a liquid, preferably milk, is added, thus diluting the mixture to the required consistency, and the resulting batter is divided into portions which are baked between baking irons which shape only the sides of the waffle, leaving the edges free.

Irregularly trimmed waffle, mainly cheese waffle, can be baked with apparatus which has heatable and closable baking irons, closed in when baking and open when being filled with batter. The present invention was further developed in such a way that the baking irons are provided with a surface which shapes the sides of the waffle, but leaves the edges free; furthermore, it has a device which forwards the baking irons on an endless path, to which the lower baking plates of the baking irons are fixed. The upper baking plates of the baking irons are in coaction with an opening cam for part of their path of motion, while in a further part of motion they are in coaction with a closing cam. The apparatus between the closing and opening cams includes a removal unit in coaction with the lower baking plates and a feeding device arranged after the removal unit in the direction of progress of the baking-irons, said device feeding batter onto the baking plate of the open baking-irons.

According to a preferred embodiment of the invention the forwarding device on the endless path is formed as a horizontal disc, on which the baking irons are radially arranged, the upper baking plates turning up at their outer ends.

It is advantageous to provide the baking irons with locking units from the end of the closing cam to the front of the opening cam, thereby keeping the baking plates in a closed position.

The removing unit can be removing a slanting plate coacting with the functional surface of the lower baking plates and arranged on a stationary supporting bar moving against a spring contrary to the direction of motion of the baking irons.

The apparatus is provided with an end unit in the vicinity of the end part of the closing cam such that the locking unit is forced into locking position.

According to a preferred embodiment of the invention the feeding device is provided with a horizontal cylinder rotatably arranged in a cylindrical housing, said cylinder having at least one opening through it in the radial direction. The piston-like feeding unit moves easily in this opening, its length being always shorter than the diameter of the cylinder. The cylinder jacket of the cylinder housing is provided with inlet and outlet openings arranged opposite each other in diametric direction and are connected by the radial opening through the cylinder, when the cylinder is suitably turned. The inlet opening of the housing is also the outlet of the raw material tank.

The process of making irregularly trimmed cheese waffle can be carried out by way of the following example:

25 eggs mixed with milk and warmed to 35° C. are poured into a mixing dish, then pre-mixed spices are sifted in. This is followed by the pouring of 1 kg of cheese which has been melted by water at a temperature of 90° C. into the mixing dish. A homogeneous mixture is produced by mixing for a few minutes. 8 kg sifted flour is added to the mixture with continuous mixing. The resulting batter is fairly hard and pasty. It is mixed to uniform consistency, then during continuous mixing fats melted in advance at 70° C., in this case 0.5 kg margerine, are added with care. When the fats are completely mixed, the paste is diluted to the required thickness by gradually adding 8 liters of lukewarm milk. After mixing for a few minutes—while 0.3 kg salt is added to the paste—the batter is ready for portioning and baking.

An embodiment of the waffle baking apparatus according to the present invention is described in detail below with reference to drawings which illustrate only one specific embodiment.

DESCRIPTION OF THE PREFERRED EMBODIMENT

Figure 1:
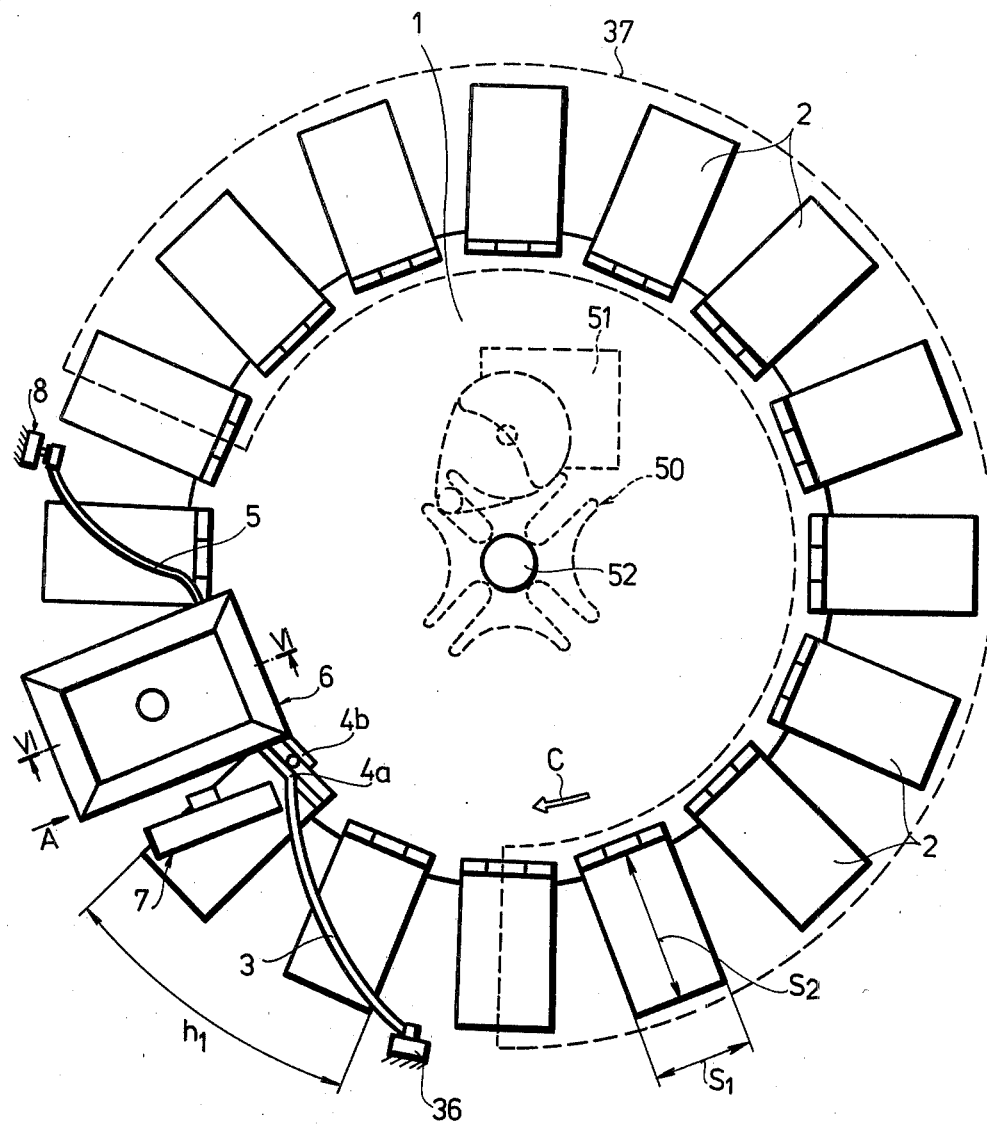
FIG. 1: Diagrammatic plan view of the waffle baking apparatus according to the invention.

The waffle baking apparatus according to the present invention has baking irons 2 consisting of upper 2a and lower baking plates 2b driven on an endless path by a device to which the lower baking plates 2b of the baking irons 2 are fixed. In the case of the present embodiment the device forwarding the baking irons 2 on endless path has a circular disc 1 the direction of rotation of which is marked with arrow C. In this case rotation of the disc 1 is intermittent, i.e. after a fixed turn the disc 1 stops for a short while, followed by further rotation. Such rotation of the disc 1 is carried out by a conventional gear, e.g. Geneva gear 50 connected with a driving unit 51. The gear 50 drives a vertical shaft 52 of the disc 1 through a conventional reducing gear (not shown).

As shown in FIG. 1 the baking irons 2 on the disc 1 are radially arranged and move in the direction C with the intermittent rotation of the disc 1. Along the path of motion of the baking irons 2 in the direction C are arranged opening element 36 followed by opening cam 3, guide rails 4a and 4b parallel to each other, closing cam 5, and end unit 8. Above the path of motion of the baking irons 2 in the area between the opening cam 3 and the closing cam 5 are arranged a feeding device 6 which feeds the batter onto the baking plates 2b and a waffle removing unit 7 located in front of the feeding device 6 which coacts with the lower baking plates 2b.

Figure 4:
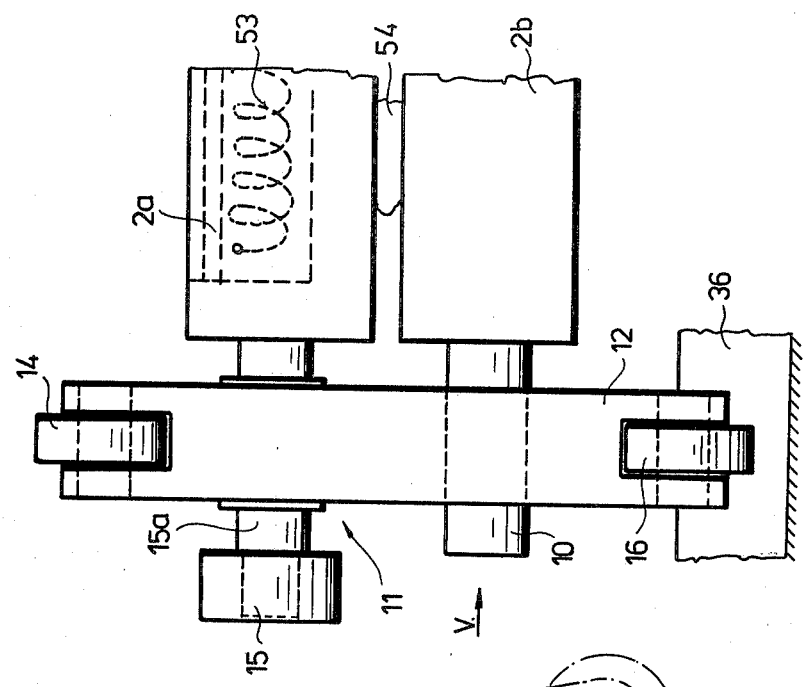
FIG. 4: View of locking unit according to the solution shown in FIGS. 1-3 in a relatively larger scale.

The baking irons 2 are heated in a conventional manner, in the case of FIG. 4 by heating wire 53 arranged in the upper baking plate 2a which wire during operation of the apparatus is connected to the electrical supply not shown. However heating of the baking irons 2 may also be accomplished as shown in FIG. 1. Here a baking duct 37 is shown with dashed line, through which the baking irons 2 pass. Heating of the heating duct 37 can be accomplished with any conventional method e.g. electric or oil or gas heating.

Figure 2:
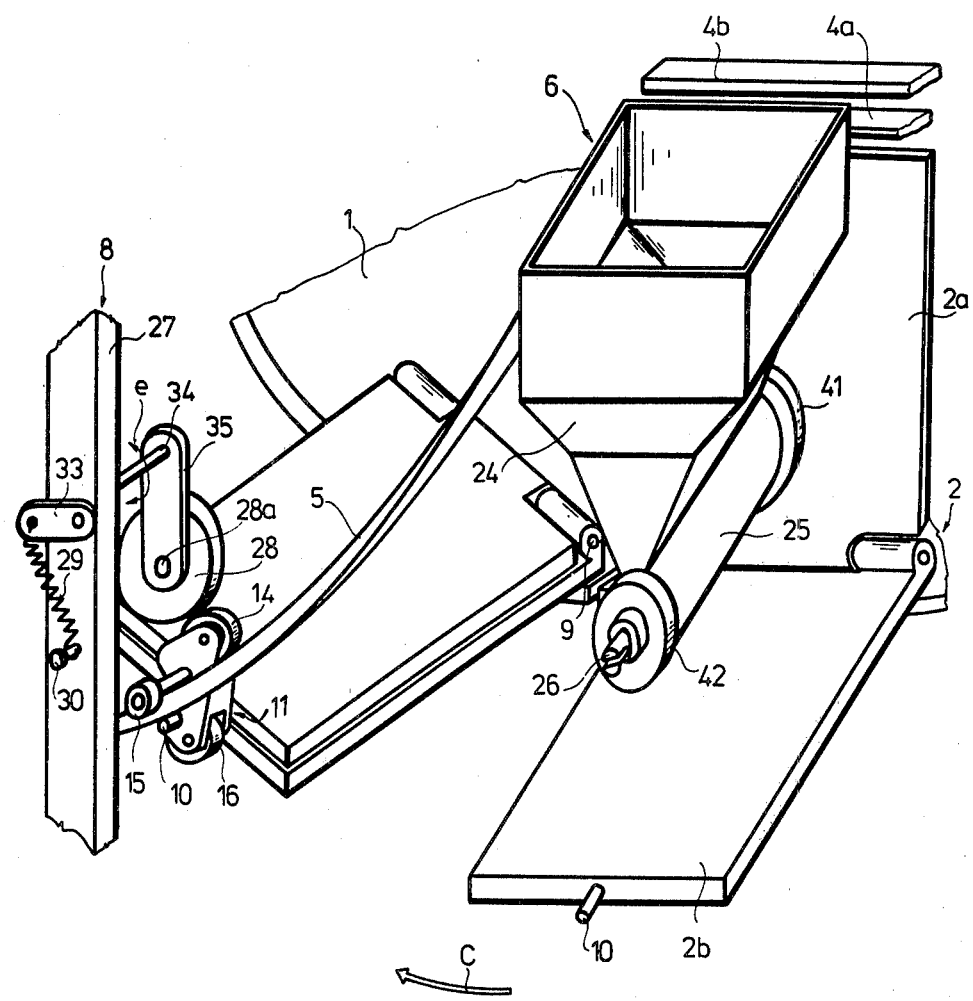
FIG. 2: Perspective view showing a detail of the apparatus according to FIG. 1 in a relatively large scale.
Figure 5:
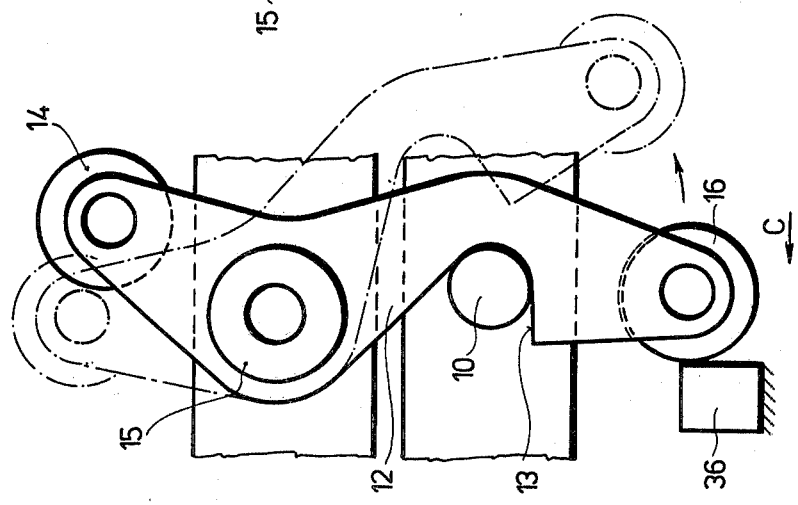
FIG. 5: View in the direction of arrow V shown in FIG. 4.

FIG. 2 shows a perspective view of certain details of the apparatus according to the invention, namely the feeding device 6 and the end unit 8 in a relatively larger scale. As already mentioned above, each baking iron 2 consists of a lower baking plate 2b and upper baking plate 2a. The lower baking plates 2b are rigidly fixed to the disc 1, while each upper baking plate 2a is hinged through a pin 9 to the lower baking plate 2b and can be turned up by its outer edge. The upper baking plate 2a in its turned down, i.e. baking, position is parallel to the corresponding lower baking plate 2b, creating a gap between them corresponding to the thickness of the cheese waffle. The upper baking plate 2a in its open turned up position is perpendicular to the lower baking plate 2b. A pin 10 extends outward from the center of the outer plate of the lower baking plate 2b and coacts with a locking unit 11 turnably embedded in the outer plate of the upper baking plate 2a. Details of the locking unit 11 are shown in FIGS. 4 and 5.

Figure 3:
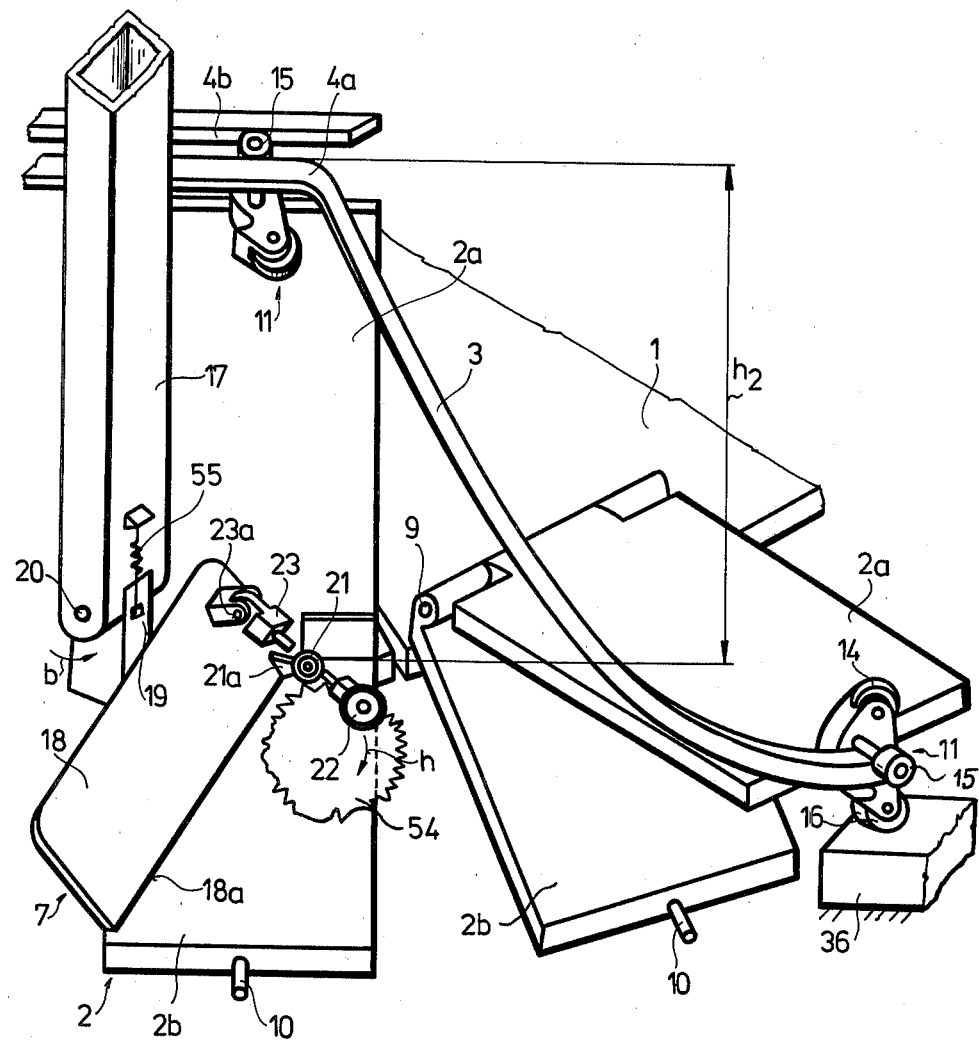
FIG. 3: Perspective view showing a further detail of the apparatus according to FIG. 1 in a larger scale.

FIG. 3 illustrates further details of the apparatus shown in FIG. 1 is a perspective view drawn to a relatively larger scale. The removing unit 7 is arranged behind, with respect to the direction of rotation C of the disc 1, the opening element 36. This removing unit has a slanting removing plate 18 which coacts with the functional surface of the lower baking plates 2b, and which is arranged tiltably against a compression spring 55 on a stationary supporting bar 17. An arm 19—the movement of which is indicated by arrow b—is hinged with a pin 20 to the lower end of the supporting bar 17. The removing plate 18 is rigidly fixed to the lower end of the arm 19. The purpose of the compression spring 55 is to press the removing plate 18 onto the lower baking plate 2b. The removing plate 18 has a removing edge 18a whereby a baked cheese waffle 54 is removed from the lower baking plate 2b.

In the embodiment shown, the removing plate 18 is provided with a guide roller 21 which extends radially outward with respect to the disc 1. The guide roller 21 is turnably embedded on a supporting plate 21A and rigidly fixed to the removing plate 18. The purpose of the guide roller 21 is to guide the removing plate 18 onto the baking plate 2b. For this purpose the guide roller 21 is arranged on the removing plate 18 in such a way as to have its lower part in the same plane as the removing edge 18a.

Furthermore, the removing plate 18 is provided with a tipping roller 22, hinged through an arm 23 (shown partially broken away in FIG. 3) and a pin 23a to the removing plate 18. The purpose of the tipping roller 22 is to tip over the baked cheese waffle 54 from the lower baking plate 2b in the direction of arrow h. The tipping roller 22 bears upon the lower baking plate 2b by its own weight and by the weight of arm 23.

Details of the locking unit 11 are clearly shown in FIGS. 4 and 5. A handle 12 of the locking unit 11 is mounted freely rotatably on a pin 15a of the upper baking plate 2a. The purpose of the locking unit 11 is to keep the upper baking plate 2a and lower baking plate 2b, from the end of the closing cam 5 to the front part of the opening cam 3, in the closed baking position. The handle 12 of the locking unit 11 is provided with rollers 14 and 16 located respectively on the top and bottom of the handle 12, which rollers in baking position are located entirely above and below and the upper baking plate 2a and lower baking plate 2b, respectively. The pin 15a is above the center of gravity of the handle 12, as a result of which the locking unit 11 tips out of its state of inertia and tries to swing back by its own weight into the state of inertia shown in FIG. 5, i.e. it is self-closing. In this case the roller 16 is in its lowest position. The handle 12 at its part below the pin 15a is provided with a lateral recess 13 to receive the pin 10 of lower baking plate 2b and retain it during the time of the baking. The pin 15a, which extends over the locking unit 11, is provided with a guide roller 15 which rolls on the cams 3 and 5. The distance of the guide rails 4a and 4b from each other is selected to be one which allows the guide roller 15 pass between them (FIG. 3).

FIG. 5 clearly shows that the locking unit 11 is opened upon impact of the roller 16 on the stationary opening element 36. While the baking iron 2 is turn in the direction of arrow C, the locking unit 11 rotates about the pin 15a into its opening position shown by dash and dot line, while the recess 13 releases the pin 10 of the upper baking plate 2a.

Details of the end unit 8 are shown in FIG. 2. It has an end roller 28 connected freely rotatably to a pin 28a. The pin 28a is fixed to a tipping arm 35. The tipping arm 35 is rigidly fixed to one end of a pin 34 led through the hole (not shown) of a stationary supporting bar 27. One end of the tipping arm 33 is connected to the other end of the pin 34. A spring 29 connects to the free end of tipping arm 33 to a lock pin 30 fixed to the supporting bar 27.

Thus the end roller 28 can be turned around the pin 34 against the spring 29 in the direction of arrow e. The end roller 28 coacts with the roller 14 of the locking unit 11. At the juncture of the end roller 28 and the roller 14 (this juncture is shown in FIG. 2) the locking unit 11 is rotated by the end (closing) unit 8 about the pin 15a into the locked position (shown in FIG. 5).

Figure 6:
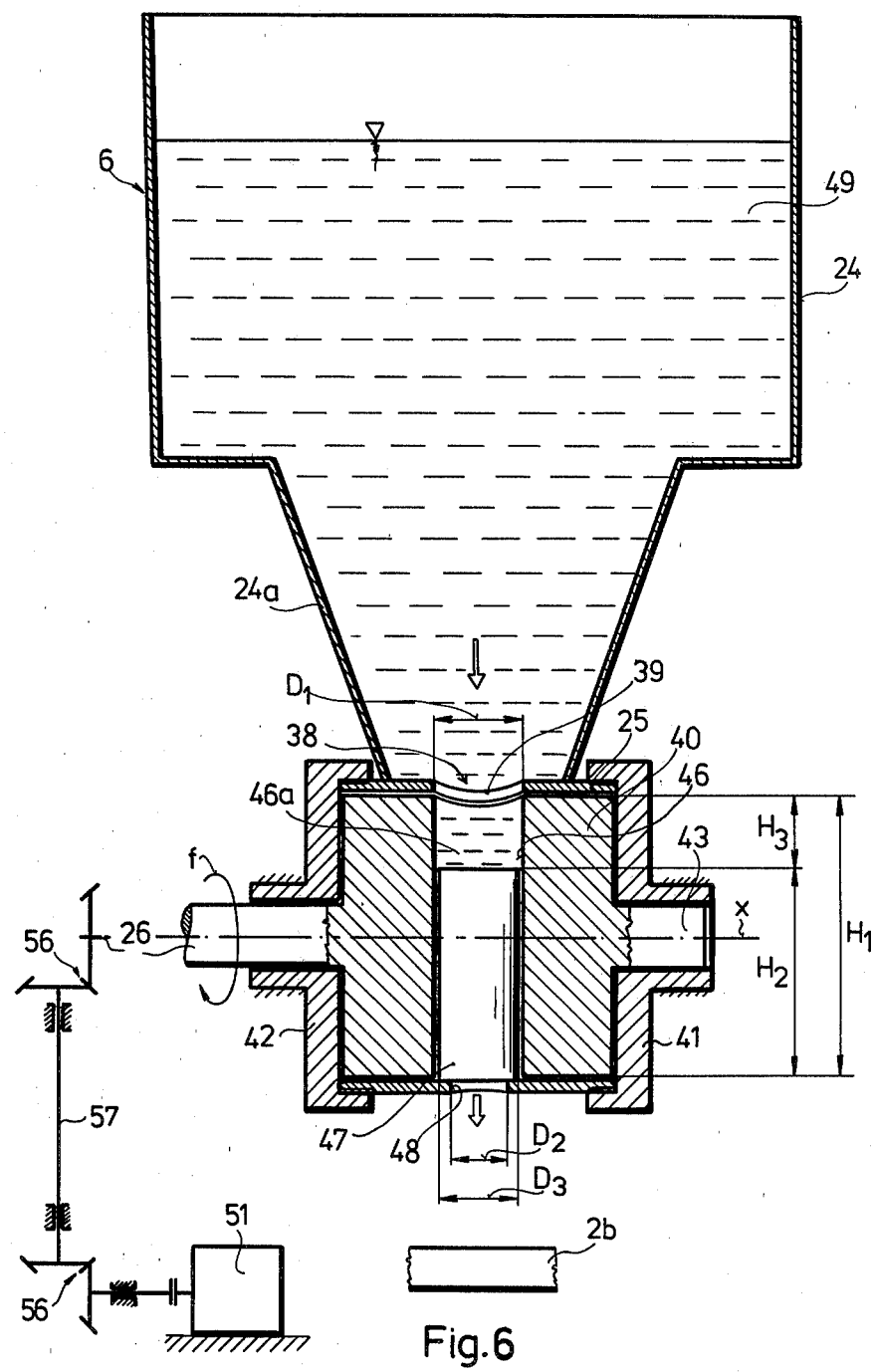
FIG. 6: Section along line VI—VI shown in FIG. 1, in a relatively larger scale.

A preferred embodiment of the feeding unit 6 is described in detail on the basis of FIGS. 2 and 6 where FIG. 6 illustrates the section taken along line VI—VI according to FIG. 1. This feeding unit has a horizontal cylinder 40 rotatably arranged in the cylindrical housing. The cylinder 40 is provided with a single opening 46 which passes radially with respect to, and entirely through, the cylinder. A piston-like feeding element 47 is arranged vertically displaceably in the opening 46, the length $H_2$ of which is selected to be less than the diameter $H_1$ of the cylinder 40. The housing in the illustrated case consists of a cylinder jacket 25 and end discs 41 and 42 threaded to the ends of the cylinder jacket 25. Shaft stubs 26 and 43 of the cylinder 40 are supported and sealed in the end discs 41 and 42. The cylinder jacket 25 has an inlet opening 39 connectible to the opening 46 of the cylinder 40—at suitable turn of the cylinder 40—and an outlet opening 48, which are arranged diametrically opposite each other end which share the same axis as the opening 46. The inlet opening 39 is connected to an outlet 38 of a hopper 24a of a raw material container 24. In the present case the raw material container 24 is rigidly fixed to the cylinder jacket 25. In the present case the diameter $D_2$ of the outlet opening 48 is selected to be less than the diameter $D_3$ of the feeding element 47 formed as a cylindrical piston. In this way the feeding element 47 is prevented from falling out of the opening 46. Diameter $D_1$ of the inlet opening 39 in this case coincides with the diameter of the opening 46.

The shaft stub 26 of the cylinder 40 in the illustrated case is in driving connection through a bevel gear pair 56 and an intermediate shaft 57 with the central driving unit 51 of the apparatus. The axis of cylinder 40 is marked with X. The the feeding space receiving the raw material—which represents the remaining part of the opening 46—is marked with reference number 46a. Height of the feeding space 46a is marked with reference character $H_3$, the volume of which feeding space is selected to be suitable for receiving a portion of raw material 49 necessary for one cheese waffle. The feeding element 47 is formed from metal, in this case from bronze and its diameter is selected to be suitable to move freely in the opening 46 by its own deadweight during the 180° rotation of the cylinder 40 in the direction f, and meanwhile to forward the raw material to the feeding space 46a, through the outlet opening 48, onto the lower baking plate 2b.

Operation of the waffle baking apparatus according to FIGS. 1-6 is as follows:

After filling up the raw material container 24 of the feeding device 6 with thick pasty batter, the central driving unit 51 is switched on, which rotates the disc 1 intermittently through gear 50 in the direction of arrow C. Consequently the cylinder 40 of the feeding device 6 is also driven through the bevel gear pair 56 and shaft 57, both connected to the central driving unit 51. Speed of the cylinder 40 is synchronized with the intermittent rotation of disc 1 in such a way that during the time necessary for a 180° turn of the feeding cylinder 40 a new lower baking plate 2b of the baking iron 2 appears under the outlet opening 48, which lower baking plate 2b remains stationary until the feeding element 47 feeds a raw material portion from the feeding space 46a through the outlet opening 48 onto the lower baking plate 2b(FIG. 2).

Upon completion of the feeding the baking iron 2 with the portioned raw material will pass from under the feeding device 6 at the next intermittent turn of disc 1. Meanwhile, the guide roller 15 of the upper baking plate 2a passes between the guide rails 4a and 4b onto the closing cam 5. The closing cam 5 forces the upper baking plate 2a downwards by the guide roller 15. The cam 5 forms a spatial curve, the vertical projection height of which is actually the same as the length $s_2$ of the upper baking plate 2a, while the horizontal projection length coincides with the width $s_1$ of the baking iron 2. (FIG. 1). Thus the closing cam 5 forces the upper baking plate 2a and the corresponding lower baking plate 2b the raw material portion on the lower baking plate 2b to be flattened by the upper baking plate 2a. At the end of the closing cam 5 the roller 14 of the locking unit 11 impacts on the end roller 28 of the end unit 8 (FIG. 2), as a result of which the locking unit 11 assumes the position marked with continuous line in FIG. 5, where the recess 13 receives and retains the pin 10 of the upper baking plate 2a. In this way the baking plates 2a and 2b are locked to each other.

The baking begins as soon as the baking plates are closed, since the current is transmitted to the heating wires 53 when the apparatus is switched on, i.e. the upper baking plates 2a are constantly heated to 160° C. Size of the disc 1 and speed of its intermittent rotation are selected so that by the time the baking iron 2 arrives at the opening element 36, the cheese waffle will be baked.

Locking of the upper baking plate 2a and lower baking plate 2b is released by impact of the lower roller 16 of the locking unit 11 with the opening element 36, whereby, during rotation of the disc 1 in the direction C, the locking unit 11 assumes the open position shown by the dash-dot line in FIG. 5. In this position the pin 10 of the upper baking plate 2a has been released by the recess 13 of the handle 12. This is followed by the guide roller 15 of the locking unit 11 passing upwards on the opening cam 3, while the upper baking plate 2a assumes the turned up, i.e. open position. The horizontal projection length $h_1$ of the opening cam 3 (FIG. 1), its projection height $h_2$ (FIG. 3) and its spatial position are selected such that when the upper baking plates 2a reach the end of the opening cam 3 they will be in a vertical position.

In the process of the experiments conducted with the above apparatus is appeared to be suitable to select the value $h_1$ to be twice the width $s_1$ of the baking iron 2 plus the clearance between the baking irons 2; furthermore, the $h_2$ value may preferably be identical with the lengths $s_2$ of the baking irons 2.

When the roller 15 of the upper baking plate 2a is between the guide rails 4a and 4b, the corresponding lower baking plate 2b together with the baked cheese waffle 54 passes into the vicinity of the removing unit 7. In this case the removing edge 18a of the removing plate 18-set to the height of the upper plane of the lower baking plates 2b—slides on the lower baking plate 2b and pushes the baked cheese waffle 54 off the lower baking plate 2b. Even in the event of certain height differences the guide roller 21 assists the guiding of the removing plates 18 onto the lower baking plate 2b. In this case the removing plate 18 may temporarily rise against the spring 55.

As shown in FIG. 3 the tipping roller 22 may already bear upon the baked cheese waffle 54, when it is not even in contact with the removing edge 18a. The roller 22 remains or rolls on the surface of the cheese waffle 54 by means of its deadweight. While the removing plate 18 pushes the cheese waffle 54 off the lower baking plate 2b leaving part of the waffle unsupported, the tipping roller 22 turns down the cheese waffle 54 from the lower baking plate 2b in the direction of arrow h and the waffle falls through the gap between the two adjacent baking irons 2 into the collecting box (not shown). Thus the tipping roller 22 prevents the cheese waffle 54 from being pushed over onto the next lower baking plate 2b during removal by the removing plate 18.

Returning to the operation of the feeding device 6, as shown in FIG. 6, the opening 46 of the cylinder 40 is connected with the inlet opening 39 of the cylinder jacket 25. In this case the raw material passes from the raw material container 24 through the outlet 38 into the feeding space 46a of the cylinder 40. This passage is assisted by the suction effect created by the continual downward motion of the feeding element 47 through the opening 46 during the rotation of cylinder 40. Thus the raw material 49 passes into the feeding space 46a safely and at a rapid rate. In the position shown in FIG. 6 the feeding space 46a is just full with a portion of raw material.

At intermediate points of rotation of the cylinder 40 in the direction of arrow f, the opening 46 of the cylinder 40 is closed by the jacket 25, thus preventing the raw material 49 from flowing out of the feeding space 46a. After each half turn of the cylinder 40, the feeding space 46a is connected with the outlet openings 48 of the cylinder jacket 25, through which opening the feeding element 47 moving downwards by its own weight pushes the raw material portion out of the feeding space 46A onto the lower baking plate 2b, being just under the outlet opening 48. The downward moving feeding element 47-as mentioned above-assists the entry of the next raw material portion into the feeding space 46a by the suction effect that it creates. Naturally the filling and emptying of feeding space 46A and begins with the partial overlapping of the corresponding holes. The above process repeats cyclically. Thus the cylinder 40 unloads two portions during its rotation of 360° which two portions pass onto two consecutive lower baking plates 26.

Naturally the apparatus according to the invention has several other alternatives and combinations within the protective circle of the invention besides the one described by way of example. Thus for instance the feeding device 6 may feed several portions of raw material and in varying quantity, when several openings and feeding elements are next to each other. Thus several waffles can be baked in each baking iron. Furthermore, several raw material containers receiving the raw materials of varying composition can be used, each connected to an inlet opening 39. In addition to the above mentioned variations, the form, size and arrangement of the baking irons 2 as well as the endless path and its drive can be solved by several other conventional methods, this, however, in light of the present invention is left to those skilled in the art.

Thus the apparatus according to the invention is suitable for the production of such new products, as; irregularly trimmed waffle, e.g. cheese waffle, which can be flavored to taste, with for instance cheese and salt. It is noted that the irregularly trimmed products of this apparatus have these significant advantages over those produced by prior art: there is no loss of raw material, since the complete raw material portion is baked as a serrated, trimmed waffle, and the use of a template for forming the edge is unnecessary, whereby the risk of sticking is reduced to the minimum and the operational safety is improved. In this way the waffle can be flavored to taste which is the main assurance of the commercial succes. (It is noted that in prior art "sticking" prevented the flavoring of the resulting waffles with cheese and salt).

Baking of the irregularly trimmed waffle can be fully automated with the proposed apparatus whereby the productivity and economic efficiency will become considerably higher than those of the known solutions. The apparatus can even be handled by a single trained worker. The feeding device 6 is capable of fast and safe feeding of raw materials of varying consistency (thick cream to thin milk). Operation of the removing unit 7 is similarly safe and automatic.

What we claim is:

1. Apparatus for baking irregularly trimmed waffles, having heatable, closable baking irons (2) comprising an upper and lower baking plate (2a, 2b) which are closed during the baking process, and form a baking plate pair and open in feeding position, the baking plate pairs (2a, 2b) of the baking irons (2) having flat surfaces forming the sides of the waffle, but leaving the edges free; a device for forwarding the baking irons (2) on an endless path, to which the lower baking plates (2b) of the baking irons (2) are fixed, an opening cam (3) and a closing cam (5), which coact with the upper baking irons in a certain section of their path of motion, a removing unit (7) disposed between the opening cam (3) and closing cam (5) so as to coact with the lower baking plates (2b), said removing unit scraping across said lower plates to remove the baked waffles from the lower baking plates in the direction of movement of the removing unit across the lower baking plates, a feeding device (6) arranged after the removing unit (7) in the direction of progress of the baking irons (2) which supplies the lower baking plate (2b) of the open baking irons (2) with a portion of raw batter, and means pressing downwardly on the upper surface of the waffle as it is removed from the lower baking plate, thereby to discharge the baked waffle downwardly between its associated baking plate and the next of said baking plates.

2. Apparatus as claimed in claim 1, characterized in that the removing unit (7) has a slanting removing plate (18) whose lower edge scrapes across the surface of the lower baking plates (2b), a spring (55) that yieldably urges the removing plate toward the lower baking plates, and a stationary bar (17) to which the spring is connected.

3. Apparatus as claimed in claim 2, and means (19, 20) mounting said removing plate (18) for vertical swinging movement about a horizontal axis on said stationary bar (17).

4. Apparatus as claimed in claim 1, said baking plates moving under said removing unit during the operation of said removing unit thereby to move the baked waffles relative to the lower baking plates in a direction opposite to the movement of the lower baking plates on said endless path.

* * * * *